US009486784B2

(12) United States Patent
Nazarpoor et al.

(10) Patent No.: US 9,486,784 B2
(45) Date of Patent: *Nov. 8, 2016

(54) THERMALLY STABLE COMPOSITIONS OF OSM FREE OF RARE EARTH METALS

(71) Applicant: Clean Diesel Technologies, Inc., Ventura, CA (US)

(72) Inventors: Zahra Nazarpoor, Camarillo, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/333,846

(22) Filed: Jul. 17, 2014

(65) Prior Publication Data
US 2015/0105246 A1   Apr. 16, 2015

Related U.S. Application Data

(63) Continuation of application No. 14/055,411, filed on Oct. 16, 2013, now Pat. No. 8,853,121.

(51) Int. Cl.
*B01J 23/00* (2006.01)
*B01J 23/32* (2006.01)
(Continued)

(52) U.S. Cl.
CPC .......... *B01J 23/8892* (2013.01); *B01D 53/945* (2013.01); *B01J 23/005* (2013.01);
(Continued)

(58) Field of Classification Search
CPC ........ B01J 23/005; B01J 23/02; B01J 23/16; B01J 23/34; B01J 23/72; B01J 23/84; B01J 23/8474; B01J 23/8892; B01J 21/063

USPC ......................... 502/324, 345, 349, 353, 524
See application file for complete search history.

(56) References Cited

U.S. PATENT DOCUMENTS 3,284,370 A   11/1966 Alan et al.
4,062,810 A   12/1977 Vogt et al.
(Continued)

FOREIGN PATENT DOCUMENTS

CH      644637 A5    8/1984
CN     102172527     9/2011
(Continued)

OTHER PUBLICATIONS

K. S. Abdel Halim et al. "Catalytic Oxidation of CO Gas over Nanocrystallite CuxMn1-xFe2O4", Feb. 26, 2008, Top Catalyst (2008) 47:66-72.

(Continued)

*Primary Examiner* — Cam N. Nguyen
(74) *Attorney, Agent, or Firm* — Alston & Bird LLP

(57) ABSTRACT

The effect of aging temperature on oxygen storage materials (OSM) substantially free from platinum group (PGM) and rare earth (RE) metals is disclosed. Samples of ZPGM-ZRE metals OSM, hydrothermally aged at a plurality of high temperatures are found to have significantly high oxygen storage capacity (OSC) and phase stability than conventional PGM catalysts with Ce-based OSM. ZPGM-ZRE metals OSM includes a formulation of Cu—Mn stoichiometric spinel structure deposited on Nb—Zr oxide support and may be converted into powder to be used as OSM application or coated onto catalyst substrate. ZPGM-ZRE metals OSM, after aging condition, presents enhanced level of thermal stability and OSC property which shows improved catalytic activity than conventional PGM catalysts including Ce-based OSM. ZPGM-ZRE metals OSM may be suitable for a vast number of applications, and more particularly in underfloor catalyst systems.

20 Claims, 8 Drawing Sheets

(51) Int. Cl.
  *B01J 23/70* (2006.01)
  *B01J 23/72* (2006.01)
  *B01J 23/889* (2006.01)
  *B01J 23/20* (2006.01)
  *C01G 45/12* (2006.01)
  *B01J 37/03* (2006.01)
  *B01J 35/00* (2006.01)
  *B01D 53/94* (2006.01)

(52) U.S. Cl.
  CPC ............ *B01J 23/20* (2013.01); *B01J 35/002* (2013.01); *B01J 37/035* (2013.01); *C01G 45/1242* (2013.01); *B01D 2255/2073* (2013.01); *B01D 2255/20715* (2013.01); *B01D 2255/20761* (2013.01); *B01D 2255/40* (2013.01); *B01D 2255/405* (2013.01); *B01D 2255/908* (2013.01); *C01P 2006/90* (2013.01); *Y02T 10/22* (2013.01)

(56) References Cited

U.S. PATENT DOCUMENTS

| | | | |
|---|---|---|---|
| 4,274,981 A * | 6/1981 | Suzuki et al. | 502/178 |
| 4,297,150 A | 10/1981 | Sims et al. | |
| 4,414,023 A | 11/1983 | Aggen et al. | |
| 4,661,329 A | 4/1987 | Suzuki et al. | |
| 4,673,556 A | 6/1987 | McCabe et al. | |
| 4,797,329 A | 1/1989 | Kilbane et al. | |
| 4,885,269 A | 12/1989 | Cyron | |
| 5,063,193 A | 11/1991 | Bedford et al. | |
| 5,162,284 A * | 11/1992 | Soled et al. | 502/324 |
| 5,238,898 A * | 8/1993 | Han et al. | 502/324 |
| 5,364,517 A * | 11/1994 | Dieckmann et al. | 208/121 |
| 5,371,056 A | 12/1994 | Leyrer et al. | |
| 5,580,553 A | 12/1996 | Nakajima | |
| 5,658,543 A | 8/1997 | Yoshida et al. | |
| 5,747,410 A | 5/1998 | Muramatsu et al. | |
| 6,129,834 A | 10/2000 | Peters et al. | |
| 6,395,244 B1 * | 5/2002 | Hartweg et al. | 423/239.1 |
| 6,576,587 B2 | 6/2003 | Labarge et al. | |
| 6,624,113 B2 | 9/2003 | Labarge et al. | |
| 6,696,389 B1 * | 2/2004 | Boegner et al. | 502/325 |
| 6,747,180 B2 | 6/2004 | Ostgard et al. | |
| 6,774,080 B2 | 8/2004 | LaBarge et al. | |
| 6,938,411 B2 | 9/2005 | Hoffmann et al. | |
| 7,129,194 B2 | 10/2006 | Baca et al. | |
| 7,393,809 B2 | 7/2008 | Kim | |
| 7,485,273 B2 | 2/2009 | Gandhi et al. | |
| 7,563,744 B2 | 7/2009 | Klein et al. | |
| 7,576,029 B2 | 8/2009 | Saito et al. | |
| 7,641,875 B1 | 1/2010 | Golden | |
| 7,749,472 B2 | 7/2010 | Chen et al. | |
| 7,772,147 B2 | 8/2010 | Collier et al. | |
| 7,803,338 B2 | 9/2010 | Socha et al. | |
| 7,875,573 B2 | 1/2011 | Beutel et al. | |
| 7,943,104 B2 | 5/2011 | Kozlov et al. | |
| 8,080,494 B2 | 12/2011 | Yasuda et al. | |
| 8,148,295 B2 | 4/2012 | Augustine | |
| 8,158,551 B2 | 4/2012 | Verdier et al. | |
| 8,168,125 B2 | 5/2012 | Choi | |
| 8,242,045 B2 | 8/2012 | Kulkarni et al. | |
| 8,318,629 B2 | 11/2012 | Alive et al. | |
| 8,845,987 B1 | 9/2014 | Nazarpoor et al. | |
| 8,853,121 B1 | 10/2014 | Nazarpoor et al. | |
| 8,858,903 B2 | 10/2014 | Nazarpoor | |
| 8,969,228 B2 | 3/2015 | Nazarpoor et al. | |
| 2002/0042341 A1 | 4/2002 | Golden | |
| 2003/0092566 A1 | 5/2003 | Inoue et al. | |
| 2004/0151647 A1 * | 8/2004 | Wanninger et al. | 423/247 |
| 2006/0120936 A1 | 6/2006 | Alive et al. | |
| 2006/0292342 A1 | 12/2006 | Ohno et al. | |
| 2008/0125308 A1 | 5/2008 | Fujdala et al. | |
| 2009/0220697 A1 | 9/2009 | Addiego | |
| 2009/0274903 A1 | 11/2009 | Addiego | |
| 2009/0324468 A1 | 12/2009 | Golden et al. | |
| 2009/0324469 A1 | 12/2009 | Golden et al. | |
| 2009/0324470 A1 | 12/2009 | Alamdari et al. | |
| 2010/0062293 A1 | 3/2010 | Triantafyllopoulos et al. | |
| 2010/0081563 A1 | 4/2010 | Edgar-Beltran et al. | |
| 2010/0152032 A1 | 6/2010 | Galligan | |
| 2010/0168449 A1 | 7/2010 | Grey et al. | |
| 2010/0184590 A1 | 7/2010 | Althofer et al. | |
| 2010/0240525 A1 | 9/2010 | Golden et al. | |
| 2010/0266473 A1 | 10/2010 | Chen et al. | |
| 2010/0293929 A1 | 11/2010 | Zhan et al. | |
| 2012/0015801 A1 | 1/2012 | Deprez et al. | |
| 2013/0115144 A1 | 5/2013 | Golden et al. | |
| 2013/0172177 A1 | 7/2013 | Domke et al. | |
| 2013/0323145 A1 | 12/2013 | Tran et al. | |
| 2014/0271384 A1 * | 9/2014 | Nazarpoor et al. | 422/168 |
| 2014/0271387 A1 * | 9/2014 | Nazarpoor | 422/170 |
| 2014/0271388 A1 * | 9/2014 | Nazarpoor et al. | 422/170 |
| 2014/0271390 A1 | 9/2014 | Nazarpoor | |
| 2014/0271391 A1 | 9/2014 | Nazarpoor | |
| 2014/0271392 A1 | 9/2014 | Nazarpoor | |
| 2014/0271393 A1 | 9/2014 | Nazarpoor | |
| 2014/0274662 A1 | 9/2014 | Nazarpoor | |
| 2014/0274674 A1 | 9/2014 | Nazarpoor et al. | |
| 2014/0274675 A1 | 9/2014 | Nazarpoor | |
| 2014/0274677 A1 * | 9/2014 | Nazarpoor | 502/324 |
| 2014/0274678 A1 | 9/2014 | Nazarpoor | |
| 2014/0301909 A1 | 10/2014 | Nazarpoor | |
| 2014/0301931 A1 | 10/2014 | Nazarpoor | |
| 2014/0302983 A1 | 10/2014 | Nazarpoor | |
| 2014/0334989 A1 | 11/2014 | Nazarpoor et al. | |
| 2014/0334990 A1 | 11/2014 | Nazarpoor | |
| 2014/0336038 A1 | 11/2014 | Nazarpoor et al. | |
| 2014/0336044 A1 * | 11/2014 | Nazarpoor et al. | 502/303 |
| 2014/0336045 A1 | 11/2014 | Nazarpoor et al. | |
| 2014/0356243 A1 | 12/2014 | Nazarpoor | |
| 2014/0357475 A1 * | 12/2014 | Nazarpoor et al. | 502/73 |
| 2014/0357479 A1 | 12/2014 | Nazarpoor et al. | |
| 2015/0005157 A1 | 1/2015 | Nazarpoor et al. | |
| 2015/0005158 A1 | 1/2015 | Nazarpoor et al. | |
| 2015/0018202 A1 | 1/2015 | Nazarpoor et al. | |
| 2015/0018203 A1 | 1/2015 | Nazarpoor et al. | |
| 2015/0018204 A1 | 1/2015 | Nazarpoor et al. | |
| 2015/0018205 A1 | 1/2015 | Nazarpoor et al. | |
| 2015/0051067 A1 | 2/2015 | Nazarpoor et al. | |
| 2015/0105242 A1 | 4/2015 | Nazarpoor et al. | |
| 2015/0105243 A1 | 4/2015 | Nazarpoor et al. | |
| 2015/0105245 A1 | 4/2015 | Nazarpoor et al. | |
| 2015/0105246 A1 | 4/2015 | Nazarpoor et al. | |
| 2015/0105247 A1 | 4/2015 | Nazarpoor et al. | |
| 2015/0147239 A1 | 5/2015 | Launois et al. | |
| 2015/0147251 A1 | 5/2015 | Nazarpoor et al. | |
| 2015/0148215 A1 | 5/2015 | Nazarpoor | |
| 2015/0148216 A1 | 5/2015 | Nazarpoor et al. | |
| 2015/0148220 A1 | 5/2015 | Nazarpoor | |
| 2015/0148222 A1 | 5/2015 | Nazarpoor | |
| 2015/0148223 A1 | 5/2015 | Nazarpoor et al. | |
| 2015/0148224 A1 | 5/2015 | Nazarpoor et al. | |
| 2015/0148225 A1 | 5/2015 | Nazarpoor et al. | |

FOREIGN PATENT DOCUMENTS

| | | |
|---|---|---|
| EP | 0022349 | 1/1981 |
| EP | 0450987 | 10/1991 |
| EP | 0605142 | 7/1994 |
| EP | 1 256 382 | 11/2002 |
| JP | 62-20613 | 1/1987 |
| JP | 4-215853 | 8/1992 |
| WO | WO 2013004814 | 1/2013 |
| WO | WO 2013068243 | 5/2013 |
| WO | WO 2013121112 | 8/2013 |
| WO | WO 2013153081 | 10/2013 |

OTHER PUBLICATIONS

D. Panayotov, "Interaction Between NO, CO and O2 on gamma-Al2O3-Supported Copper—Manganese Oxides", 1996, React. Kinet.Catal.Lett. vol. 58, No. 1, 73-78.

(56) References Cited

OTHER PUBLICATIONS

Tanaka et al., "Influence of preparation method and additive for Cu-Mn spinel oxide catalyst on water gas shift reaction of reformed fuels", Applied Catalysis A: General 279 (2005) 59-66.

Papavasilious et al., "Combined Steam reforming of methanol over Cu-Mn spinel oxide catalysts", Journal of Catalysis 251 (2007) 7-20.

Mestres et al., Phase Diagram at Low Temperature of the System $ZrO_2/Nb_2O_5$, Z.Znorg. Alig. Chem., 2001, 627, 294-298.

Non-Final Office Action for U.S. Appl. No. 13/849,169 issued Mar. 6, 2014.

Hayes et al., "Introduction to Catalytic Combustion", pp. 310-313, 1997 OPA (Overseas Publishers Association).

* cited by examiner

US 9,486,784 B2

THERMALLY STABLE COMPOSITIONS OF OSM FREE OF RARE EARTH METALS

CROSS-REFERENCE TO RELATED APPLICATIONS

This application is a continuation of U.S. patent application Ser. No. 14/055,411, titled "Thermally Stable Compositions of OSM Free of Rare Earth Metals", filed Oct. 16, 2013, which is related to U.S. patent application Ser. No. 14/055,334, titled "Zero-PGM Catalyst with Oxygen Storage Capacity for TWC Systems", filed Oct. 16, 2013, the entirety of which is incorporated by reference as if fully set forth herein.

BACKGROUND

1. Field of the Disclosure

This disclosure relates generally to oxygen storage materials having high oxygen storage capacity with different applications and, more particularly, to the effect of aging in the phase stability of OSM which is free of platinum group metals and rare earth metals, for catalyst systems.

2. Background Information

Three-way catalysts (TWC), including platinum group metals (PGM) as active sites, alumina-based supports with a large specific surface, and, metal oxide promoter materials that regulate oxygen storage properties, are placed in the exhaust gas line of internal combustion engines for the control of carbon monoxide (CO), unburnt hydrocarbons (HC) and nitrogen oxides (NOx) emissions.

Oxygen storage material (OSM) included in a TWC catalyst system is needed for storing excess oxygen in an oxidizing atmosphere and releasing it in a reducing atmosphere. Through oxygen storage and release, a safeguard is obtained against fluctuations in exhaust gas composition during engine operation, enabling the system to maintain a stoichiometric atmosphere in which NOx, CO and HC can be converted efficiently.

Ceria ($CeO_2$) was the first material used as OSM in catalyst systems because of its effective oxygen storage capacity (OSC) properties. Subsequently, a $CeO_2$—$ZrO_2$ solid solution replaced ceria because of its improved OSC and thermal stability. Current TWCs are exposed to high operation temperatures due to the use of closed-loop coupled catalysts near the engine. Additionally, the TWC's demand for PGM and rare earth (RE) metals continues to increase due to their efficiency in removing pollutants from internal combustion engine exhausts, placing at the same time a strain on the supply of PGM and RE metals, which drives up their cost and the cost of catalysts applications.

Recent environmental concerns for a catalyst's high performance have increased the focus on the operation of a TWC at the end of its lifetime. Catalytic materials used in TWC applications have also changed, and the new materials have to be thermally stable under the fluctuating exhaust gas conditions. The attainment of the requirements regarding the techniques to monitor the degree of the catalyst's deterioration/deactivation demands highly active and thermally stable catalysts.

Therefore, it may be desirable to have OSMs, without PGM and RE metal components, that may allow the preparation of a new generation of oxygen storage materials with very high OSC and oxygen ion mobility. These are very important elements for the advancement of TWC technology to effect emission reduction across a range of temperature and operating conditions, while maintaining or even improving upon the thermal and chemical stability under normal operating conditions and up to the theoretical limit in real catalysts.

SUMMARY

The effect of thermal treatment on oxygen storage materials (OSM) substantially free from platinum group (PGM) and rare earth (RE) metals is disclosed. The present disclosure may provide enhanced OSM which may exhibit optimal OSC property required for high performance, enhanced activity and thermal stability, and facile nature of the redox function of the included chemical components. The OSM, including zero PGM (ZPGM) and zero RE metals (ZRE), may be prepared using any suitable synthesis method to use as coating layer on substrate or to form powder which may be employed as raw material for a large number of applications, and, more particularly, for catalyst systems.

According to an embodiment in the present disclosure, the ZPGM-ZRE metals OSM may include a Cu—Mn spinel phase with Niobium-Zirconia support oxide, where the material may be dried and calcined at about 600° C. to form spinel structure.

According to other embodiments in the present disclosure, hydrothermally aged samples of ZPGM-ZRE metals OSM may be prepared to analyze/measure the OSC property of the hydrothermally aged samples of ZPGM-ZRE metals OSM, as well as the effect of the aging temperature in the phase stability of the Cu—Mn spinel structure with Niobium-Zirconia support employed in the present disclosure. The aged OSM samples may be treated within a range of hydrothermal aging temperature from about 800° C. to 1,000° C.

The OSC property of the hydrothermally aged samples of ZPGM-ZRE metals OSM may be determined using CO and $O_2$ pulses under isothermal oscillating condition, referred in the present disclosure as OSC test, to determine $O_2$ and CO delay times. The effect of aging temperature in the phase stability of the Cu—Mn spinel phase with Niobium-Zirconia support may be analyzed/measured using XRD analysis to confirm the phase stability of the ZPGM-ZRE metals OSM samples under aging condition.

Performance of the hydrothermally aged ZPGM-ZRE metals OSM may be compared under isothermal oscillating condition and under fuel aging condition with commercial PGM catalyst samples including conventional Ce-based OSM.

According to other embodiment in the present disclosure, OSC property of ZPGM-ZRE metals OSM under hydrothermal aging condition may be provided at a plurality of temperatures within a range of about 800° C. to about 1,000° C. for comparison with PGM catalyst samples including Ce-based OSM.

It may be found from the present disclosure that although the catalytic activity, and thermal and chemical stability of a catalyst during real use may be affected by factors, such as the chemical composition of the catalyst, the OSC property of ZPGM-ZRE metals OSM may provide an indication that for catalyst applications, and, more particularly, for catalyst systems, the chemical composition of the OSM, free of PGM and RE metals, may have enhanced stability at high temperature of operation, and from a catalyst manufacturer's viewpoint, an essential advantage given the economic factors involved and the flexibility for use in underfloor and closed-loop coupled catalyst applications.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
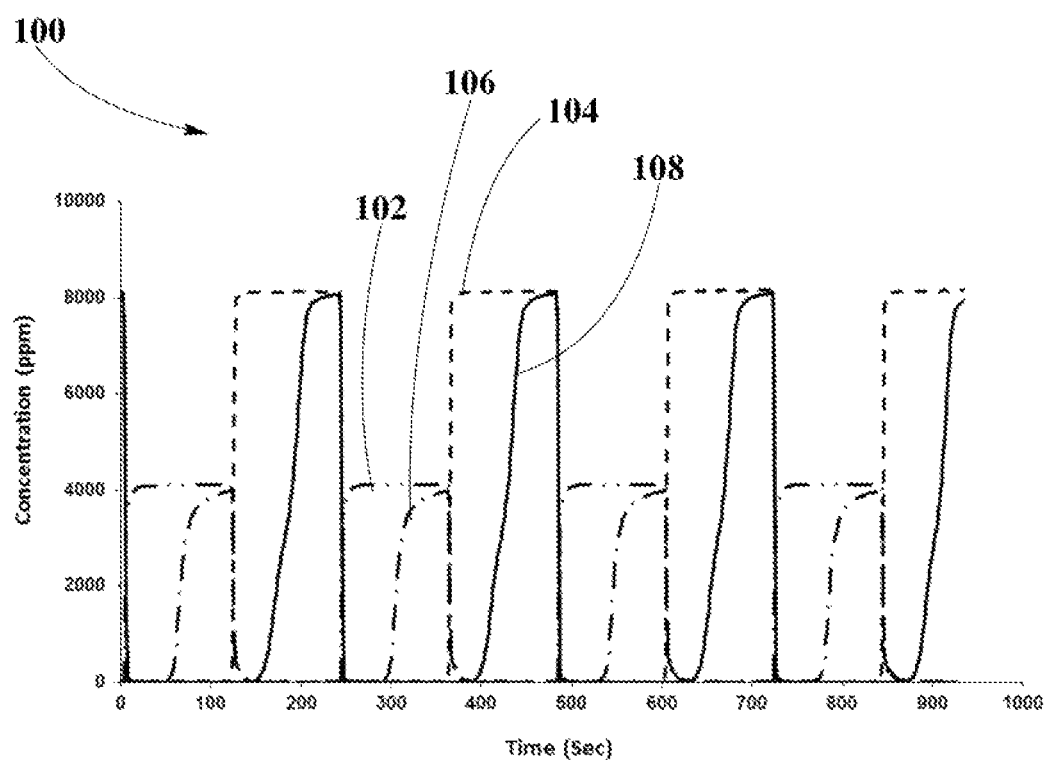
FIG. 1 shows OSC test results for a ZPGM-ZRE metals OSM hydrothermally aged at about 800° C., 20 hours, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Definitions

As used here, the following terms may have the following definitions:

"Platinum group metal (PGM)" refers to platinum, palladium, ruthenium, iridium, osmium, and rhodium.

"Zero platinum group metal (ZPGM)" refers to metals not included in the platinum group metals.

"Rare earth (RE) metals" refers to chemical elements in the lanthanides group, scandium, and yttrium.

"Zero rare earth metals (ZRE)" refers to metals not included in the rare earth metals.

"Catalyst" refers to one or more materials that may be of use in the conversion of one or more other materials.

"Substrate" refers to any material of any shape or configuration that yields a sufficient surface area for depositing a washcoat and/or overcoat.

"Washcoat" refers to at least one coating including at least one oxide solid that may be deposited on a substrate.

"Milling" refers to the operation of breaking a solid material into a desired grain or particle size.

"Co-precipitation" may refer to the carrying down by a precipitate of substances normally soluble under the conditions employed.

"Calcination" refers to a thermal treatment process applied to solid materials, in presence of air, to bring about a thermal decomposition, phase transition, or removal of a volatile fraction at temperatures below the melting point of the solid materials.

"Oxygen storage material (OSM)" refers to a material able to take up oxygen from oxygen rich streams and able to release oxygen to oxygen deficient streams.

"Oxygen storage capacity (OSC)" refers to the ability of materials used as OSM in catalysts to store oxygen at lean condition and to release it at rich condition.

"Conversion" refers to the chemical alteration of at least one material into one or more other materials.

"Adsorption" refers to the adhesion of atoms, ions, or molecules from a gas, liquid, or dissolved solid to a surface.

"Desorption" refers to the process whereby atoms, ions, or molecules from a gas, liquid, or dissolved solid are released from or through a surface.

"X-ray diffraction" or "XRD Analysis" refers to the analytical technique that investigates crystalline material structure, including atomic arrangement, crystalline size, and imperfections in order to identify unknown crystalline materials (e.g. minerals, inorganic compounds).

Description Of The Drawings

The present disclosure may generally provide the effect of aging temperature on ZPGM-ZRE metals OSMs, which according to principles in the present disclosure may have enhanced OSC and thermal stability, incorporating more active components into phase materials possessing properties, such as improved oxygen mobility and phase stability, to enhance the catalytic activity of the catalyst system in which the ZPGM-ZRE metals OSM may be employed.

OSM Material Composition and Preparation

The OSM in the present disclosure may include a chemical composition that is substantially free from PGM and RE metals to prepare an OSM powder which may be used as a raw material for a large number of catalyst applications, and, more particularly, in TWC systems. The powder material may be prepared from a Cu—Mn stoichiometric spinel structure, $Cu_{1.0}Mn_{2.0}O_4$, supported on $Nb_2O_5$—$ZrO_2$ by using co-precipitation method or any other preparation technique known in the art.

The preparation of OSM may begin by milling $Nb_2O_5$—$ZrO_2$ support oxide to make aqueous slurry. The $Nb_2O_5$—$ZrO_2$ support oxide may have $Nb_2O_5$ loadings of about 15% to about 30% by weight, preferably about 25% and $ZrO_2$ loadings of about 70% to about 85% by weight, preferably about 75%.

The Cu—Mn solution may be prepared by mixing an appropriate amount of Mn nitrate solution ($MnNO_3$) and Cu nitrate solution ($CuNO_3$), where the suitable copper loadings may include loadings in a range of about 10% to about 15% by weight. Suitable manganese loadings may include loadings in a range of about 15% to about 25% by weight. The next step is precipitation of Cu—Mn nitrate solution on $Nb_2O_5$—$ZrO_2$ support oxide aqueous slurry, which may have added thereto an appropriate base solution, such as in order to adjust the pH of the slurry to a suitable range. The precipitated slurry may be aged for a period of time of about 12 to 24 hours under continued stirring at room temperature.

For preparation of powder OSM, after precipitation step, the slurry may undergo filtering and washing, where the resulting material may be dried overnight at about 120° C. and subsequently calcined at a suitable temperature within a range of about 550° C. to about 650° C., preferably at about 600° C. for about 5 hours. The prepared powder of OSM without PGM and RE metals, according to principles in the present disclosure, may be used for a variety of catalyst system applications, particularly TWC systems.

According to principles in the present disclosure, OSM may be used as coating layer on substrate, using a cordierite substrate with honeycomb structure, where substrate may have a plurality of channels with suitable porosity. The OSM in form of aqueous slurry of Cu—Mn/$Nb_2O_5$—$ZrO2$ may be deposited on the suitable substrate to form a washcoat (WC) employing vacuum dosing and coating systems. In the present disclosure, a plurality of capacities of WC loadings may be coated on the suitable substrate. The plurality of WC loading may vary from about 60 g/L to about 200 g/L, in this disclosure particularly about 120 g/L. Subsequently, after deposition on substrate of the suitable loadings of Cu—Mn/$Nb_2O_5$—$ZrO2$ OSM slurry, the washcoat may be treated.

According to embodiments in the present disclosure, treatment of the WC may be enabled employing suitable drying and heating processes. A commercially-available air knife drying systems may be employed for drying the WC. Heat treatments may be performed using commercially-available firing (calcination) systems. The treatment may take from about 2 hours to about 6 hours, preferably about 4 hours, at a temperature within a range of about 550° C. to about 650° C., preferably at about 600° C.

A suitable OSM deposited on substrate may have a chemical composition with a total loading of about 120 g/L, including a Cu—Mn spinel structure with copper loading of about 10 g/L to about 15 g/L and manganese loading of about 20 g/L to about 25 g/L. The $Nb_2O_5$—$ZrO_2$ support oxide may have loadings of about 80 g/L to about 90 g/L.

According to principles in the present disclosure, the ZPGM-ZRE metals OSM may be subjected to testing under OSC isothermal oscillating condition to determine the $O_2$ and CO delay times and OSC property at a selected temperature. A set of different $O_2$ and CO delay times may be obtained when a range of temperatures may be chosen to further characterize the OSC property of the ZPGM-ZRE metals OSM. The OSC property obtained from testing may be used to compare the results with a commercial PGM catalyst including Ce-based OSM. In order to check the effect of aging in the phase stability, the thermal stability, of the Cu—Mn spinel phase in ZPGM-ZRE metals OSM, samples may be hydrothermally aged employing about 10% steam/air or fuel flow at a plurality of temperatures within a range from about 800° C. to about 1,000° C. for about 4 hours. ZPGM-ZRE metals OSM results may be compared with a commercial PGM catalyst samples which may be subjected to hydrothermal and/or fuel aging condition at different temperatures.

The effect of aging in the stability of the Cu—Mn spinel phase in ZPGM-ZRE metals OSM may be evaluated by XRD analysis of the corresponding phases at the selected hydrothermal aging temperatures.

OSC Isothermal Oscillating Test Procedure

Testing of the OSC property of ZPGM-ZRE metals OSM may be performed under isothermal oscillating condition to determine $O_2$ and CO delay times, the time required to reach to 50% of the $O_2$ and CO concentration in feed signal. Testing may be performed for hydrothermally aged samples of ZPGM-ZRE metals OSM and PGM catalyst samples under hydrothermal and fuel aging condition to compare performance.

The OSC isothermal test may be carried out at temperature of about 575° C. with a feed of either $O_2$ with a concentration of about 4,000 ppm diluted in inert nitrogen ($N_2$), or CO with a concentration of about 8,000 ppm of CO diluted in inert $N_2$. The OSC isothermal oscillating test may be performed in a quartz reactor using a space velocity (SV) of 60,000 $hr^{-1}$, ramping from room temperature to isothermal temperature of about 575° C. under dry $N_2$. At the temperature of about 575° C., OSC test may be initiated by flowing $O_2$ through the hydrothermally aged OSM sample in the reactor, and after 2 minutes, the feed flow may be switched to CO to flow through the hydrothermally aged OSM sample in the reactor for another 2 minutes, enabling the isothermal oscillating condition between CO and $O_2$ flows during a total time of about 1,000 seconds. Additionally, $O_2$ and CO may be allowed to flow in the empty test reactor not including the hydrothermally aged ZPGM-ZRE metals OSM. Subsequently, testing may be performed allowing $O_2$ and CO to flow in the test tube reactor including the hydrothermally aged ZPGM-ZRE metals OSM and analyze/measure the OSC property of hydrothermally aged OSM sample. As ZPGM-ZRE metals OSM may have OSC property, the hydrothermally aged OSM may store $O_2$ when $O_2$ flows. Subsequently, when CO may flow, there is no $O_2$ flowing, and the $O_2$ stored in the hydrothermally aged OSM may react with the CO to form $CO_2$. The time during which the OSM may store $O_2$ and the time during which CO may be oxidized to form $CO_2$ may be measured.

OSC Property of Hydrothermally Aged ZPGM-ZRE Metals OSM Samples

FIG. 1 shows OSC isothermal oscillating test 100 for an aged sample of ZPGM-ZRE metals OSM, according to an embodiment. OSC isothermal oscillating test 100 may be performed in the test reactor using SV of 60,000 $hr^{-1}$, ramping from room temperature to isothermal temperature of about 575° C. under dry $N_2$. Repeated switching from flowing $O_2$ and flowing CO may be enabled about every 2 minutes for a total time of about 1,000 seconds. The aged sample of ZPGM-ZRE metals OSM in the present embodiment may be hydrothermally aged employing 10% steam/air at about 800° C. for about 20 hours.

In FIG. 1, curve 102 (double-dot dashed graph) shows the result of flowing about 4,000 ppm $O_2$ through an empty test reactor which may be used for OSC isothermal oscillating test 100; curve 104 (dashed graph) depicts the result of flowing about 8,000 ppm CO through the empty test reactor; curve 106 (single-dot dashed graph) shows the result of flowing about 4,000 ppm $O_2$ through the test reactor including aged sample of ZPGM-ZRE metals OSM; and curve 108 (solid line graph) depicts the result of flowing about 8,000 ppm CO through the test reactor including aged sample of ZPGM-ZRE metals OSM.

It may be observed in FIG. 1 that the $O_2$ signal in presence of aged sample of ZPGM-ZRE metals OSM, as shown in curve 106, does not reach the $O_2$ signal of empty reactor shown in curve 102. This result indicates the storage of a large amount of $O_2$ in the aged sample of ZPGM-ZRE metals OSM. The measured $O_2$ delay time, which is the time required to reach to an $O_2$ concentration of 2,000 ppm (50% of feed signal) in presence of aged sample of ZPGM-ZRE metals OSM, is about 61.82 seconds. The $O_2$ delay time measured from OSC isothermal oscillating test 100 indicates that the aged sample of ZPGM-ZRE metals OSM has a significant OSC property in which hydrothermal aging condition at about 800° C. for about 20 hours may be a very important parameter to consider for the obtained high activity.

Similar result may be observed for CO. As may be seen, the CO signal in presence of aged sample of ZPGM-ZRE metals OSM shown in curve 108 does not reach the CO signal of empty reactor shown in curve 104. This result indicates the consumption of a significant amount of CO by aged sample of ZPGM-ZRE metals OSM and desorption of stored $O_2$ for the conversion of CO to $CO_2$. The measured CO delay time, which is the time required to reach to a CO concentration of 4000 ppm (50% of feed signal) in the presence of aged sample of ZPGM-ZRE metals OSM is about 64.45 seconds. The CO delay time measured from OSC isothermal oscillating test 100 shows that the aged sample of ZPGM-ZRE metals OSM has a significantly high OSC property.

The measured $O_2$ delay time and CO delay times may be an indication that the aged sample of ZPGM-ZRE metals OSM may exhibit enhanced OSC as noted by the highly activated total and reversible oxygen adsorption and CO conversion that occurs under isothermal oscillating condition.

Figure 2:
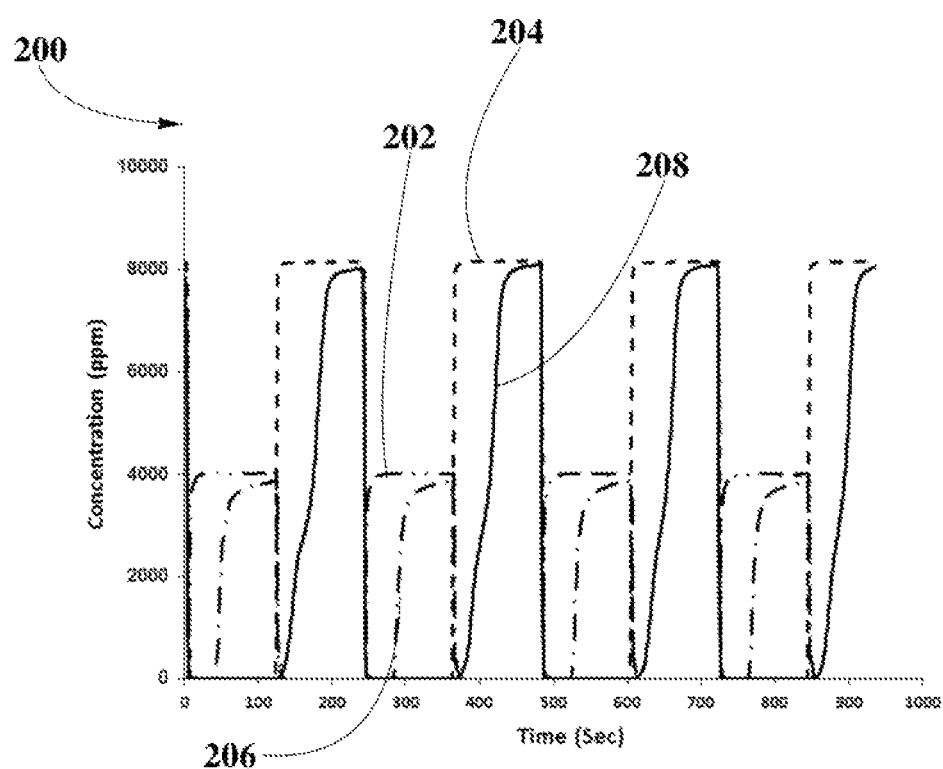
FIG. 2 depicts OSC test results for a ZPGM-ZRE metals OSM hydrothermally aged at about 900° C., 4 hours, according to an embodiment.

FIG. 2 shows OSC isothermal oscillating test 200 for an aged ZPGM-ZRE metals OSM at temperature of about 575° C., according to an embodiment. In FIG. 2, curve 202 (double-dot dashed graph) shows the result of flowing about 4,000 ppm $O_2$ through the empty test reactor; curve 204 (dashed graph) depicts the result of flowing about 8,000 ppm CO through the empty test reactor; curve 206 (single-dot dashed graph) shows the result of flowing about 4,000 ppm $O_2$ through the test reactor including ZPGM-ZRE metals OSM; and curve 208 (solid line graph) depicts the result of flowing about 8,000 ppm CO through the test reactor including ZPGM-ZRE metals OSM.

OSC Isothermal oscillating test 200 may be performed in the test reactor using SV of 60,000 $hr^{-1}$, ramping from room temperature to isothermal temperature of about 575° C. under dry $N_2$. Repeated switching from flowing $O_2$ and flowing CO may be enabled about every 2 minutes for a total time of about 1,000 seconds. The sample of ZPGM-ZRE metals OSM may be hydrothermally aged employing 10% steam/air at about 900° C. for about 4 hours.

As may be seen in FIG. 2, the gap between curve 202 and curve 206 may indicate that there is $O_2$ storage in the aged ZPGM-ZRE metals OSM, with $O_2$ delay time of about 45.54 seconds. Similarly, the gap between curve 204 and curve 208 may indicate that there is CO adsorption/consumption by aged ZPGM-ZRE metals OSM. Carbon balance results of the aged sample of ZPGM-ZRE metals OSM shows formation or $CO_2$ at this step where the $O_2$ required for oxidation is released from the $O_2$ stored in the aged ZPGM-ZRE metals OSM during flowing of the $O_2$ feed. The CO delay time of about 51.05 seconds was measured for the aged ZPGM-ZRE metals OSM. The measured $O_2$ delay time and CO delay time may be an indication that the aged ZPGM-ZRE metals OSM may exhibit, after hydrothermal aging at about 900° C. for about 4 hours, an OSC property that is less than the resulting OSC property obtained for the hydrothermally aged at 800° C., as noted by the decrease in $O_2$ and CO delay times. However, the resulting $O_2$ and CO delay times are indicative of an above satisfactory OSC property and thermal stability of the ZPGM-ZRE metals OSM in the present embodiment.

Figure 3:
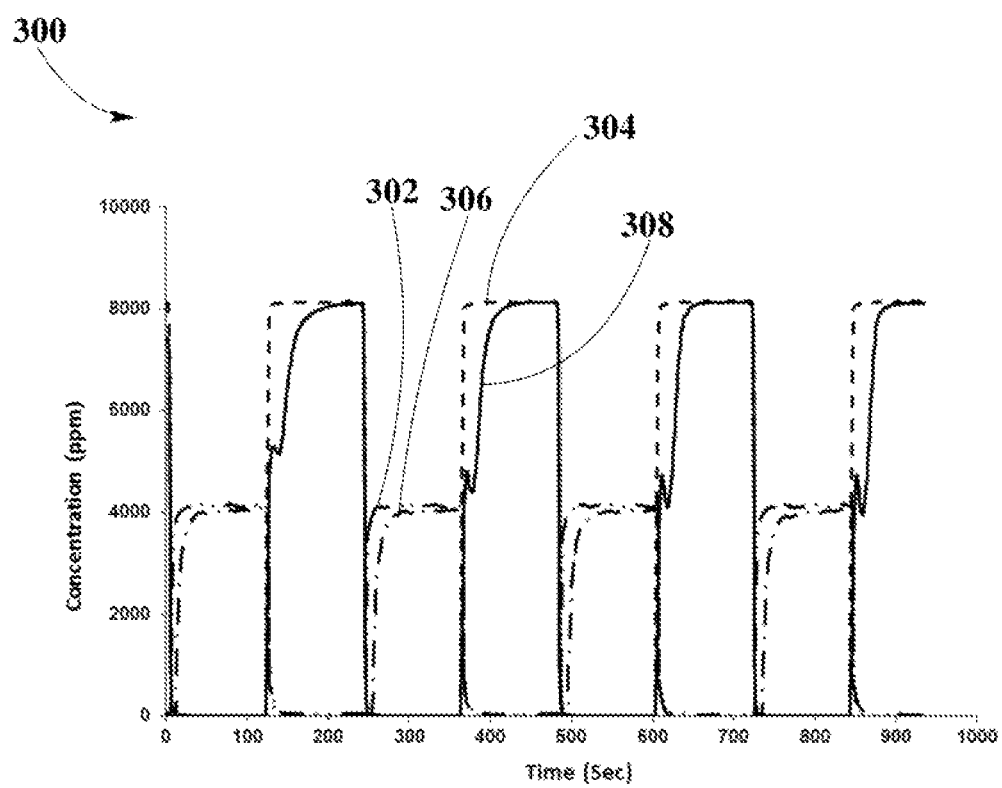
FIG. 3 illustrates OSC isothermal oscillating test results for a ZPGM-ZRE metals OSM hydrothermally aged at about 1,000° C., 4 hours, according to an embodiment.

FIG. 3 shows OSC isothermal oscillating test 300 for an aged sample of ZPGM-ZRE metals OSM at a temperature of about 575° C., according to an embodiment. In FIG. 3, curve 302 (double-dot dashed graph) shows the result of flowing about 4,000 ppm $O_2$ through the empty test reactor; curve 304 (dashed graph) depicts the result of flowing about 8,000 ppm CO through the empty test reactor; curve 306 (single-dot dashed graph) shows the result of flowing about 4,000 ppm $O_2$ through the test reactor including ZPGM-ZRE metals OSM; and curve 308 (solid line graph) depicts the result of flowing about 8,000 ppm CO through the test reactor including ZPGM-ZRE metals OSM.

OSC isothermal oscillating test 300 may be performed in the test reactor using SV of 60,000 $hr^{-1}$, ramping from room temperature to isothermal temperature of about 575° C. under dry $N_2$. Repeated switching from flowing $O_2$ and flowing CO may be enabled about every 2 minutes for a total time of about 1,000 seconds. The sample of ZPGM-ZRE metals OSM may be hydrothermally aged employing 10% steam/air at about 1,000° C. for about 4 hours.

As may be seen in FIG. 3, the gap between curve 302 and curve 306 may indicate that there is $O_2$ storage in the OSM with $O_2$ delay time of about 11.18 seconds. Similarly, the gap between curve 304 and curve 308 may indicate that there is CO adsorption/consumption by the ZPGM-ZRE metals OSM. Carbon balance results of the aged sample of ZPGM-ZRE metals OSM shows formation or $CO_2$ at this step where the $O_2$ required for oxidation is released from the $O_2$ stored in the aged sample of ZPGM-ZRE metals OSM during flowing of the $O_2$ feed. The CO delay time of about 15.6 seconds was measured for the aged ZPGM-no RE metals OSM sample. The measured $O_2$ delay time and CO delay time may be an indication that the ZPGM-ZRE metals OSM may exhibit, after hydrothermal aging at about 1,000° C., an OSC property that is less than the resulting OSC property obtained for ZPGM-ZRE metals OSM, which is hydrothermally aged at about 900° C., as noted by the decrease in $O_2$ and CO delay times that resulted during OSC isothermal oscillating test 300. However, the resulting $O_2$ and CO delay times are indicative of existence of good OSC property. The measured OSC property of ZPGM-ZRE metals OSM sample hydrothermally aged at about 1,000° C. for about 4 hours may be correlated to indicate that even for thermal aging at a significant higher temperature, the ZPGM-ZRE metals OSM is thermally stable.

OSC Property of a ZPGM-ZRE Metals OSM Samples Under Commercial Aging Condition

Figure 4:
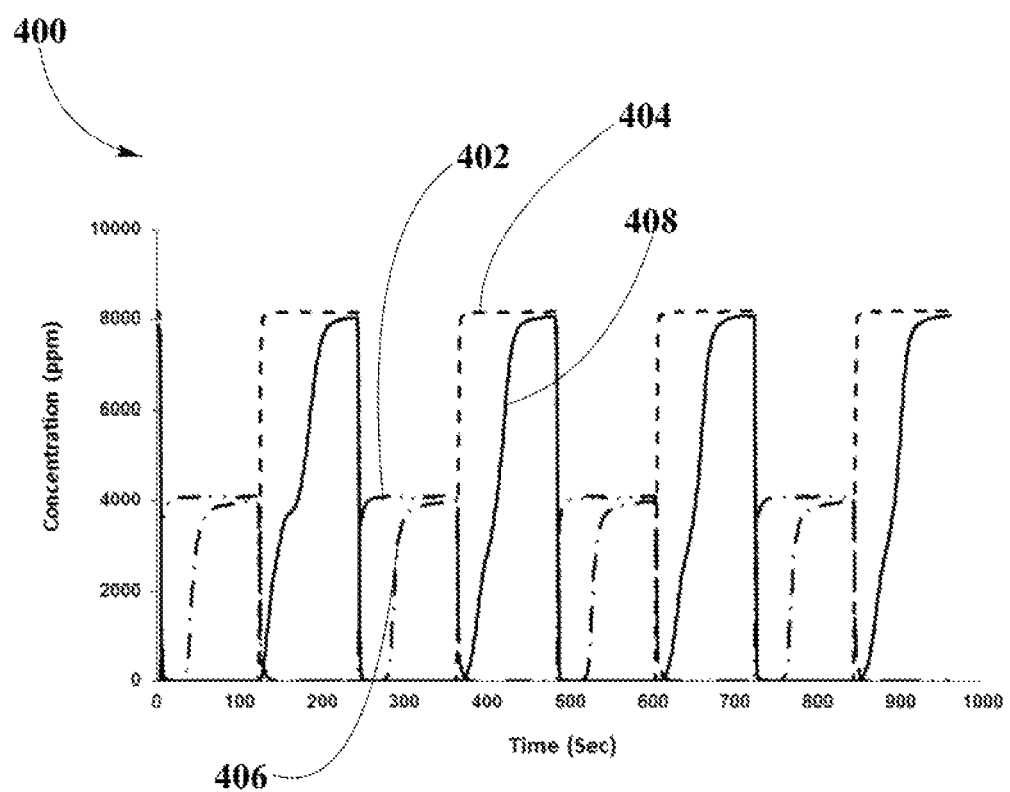
FIG. 4 shows OSC isothermal oscillating test for a ZPGM-ZRE metals OSM aged at about 800° C. under commercial fuel aging condition, according to an embodiment.

FIG. 4 shows OSC isothermal oscillating test 400 for a sample of ZPGM-ZRE metals OSM under commercial aging for underfloor condition, according to an embodiment. OSC isothermal oscillating test 400 may be performed in a reactor using SV of 60,000 $hr^{-1}$, ramping from room temperature to isothermal temperature of about 575° C. under dry $N_2$. Repeated switching from flowing $O_2$ and flowing CO may be enabled about every 2 minutes for a total time of about 1,000 seconds.

Commercial aging of the ZPGM-ZRE metals OSM sample may be performed at a temperature of about 800° C. for about 20 hours, with fuel gas containing CO, O2, CO2, H2O and N2 as aging fuel feed running at moderate or high power to test the thermal and chemical stability of the ZPGM-ZRE metals OSM sample.

Results from OSC isothermal oscillating test 400 may be seen in FIG. 4, where curve 402 (double-dot dashed graph) shows the result of flowing about 4,000 ppm $O_2$ through the empty test reactor; curve 404 (dashed graph) depicts the result of flowing about 8,000 ppm CO through the empty test reactor; curve 406 (single-dot dashed graph) shows the result of flowing about 4,000 ppm $O_2$ through the test reactor including the aged sample of ZPGM-ZRE metals OSM; and curve 408 (solid line graph) depicts the result of flowing about 8,000 ppm CO through the test reactor including the aged sample of ZPGM-ZRE metals OSM.

As may be seen in FIG. 4, the gap between curve 402 and curve 406 may indicate that there is $O_2$ stored by the ZPGM-ZRE metals OSM with $O_2$ delay time of about 43.95 seconds. Similarly, a CO delay time for the sample of ZPGM-ZRE metals OSM is measured to be about 48.59 seconds. The measured $O_2$ delay time and CO delay time may be an indication that the aged sample of ZPGM-ZRE metals OSM may exhibit a very high OSC property. The ZPGM-ZRE metals OSM under commercial aging condition may provide optimal catalytic performance for underfloor catalyst applications, which may be confirmed the the very high OSC property that results after OSC isothermal oscillating test 400. The behavior of the sample of ZPGM-ZRE metals OSM under commercial aging condition may outperform PGM catalysts used for underfloor applications under real use condition.

Comparison of OSC Property of Aged ZPGM-ZRE OSM Samples with Commercial PGM

FIG. 5 depicts OSC property comparison 500 of hydrothermally aged samples of ZPGM-ZRE metals OSM with commercial PGM samples with RE metals as OSM, with variation of the hydrothermal aging temperature, according to an embodiment.

Figure 5A:
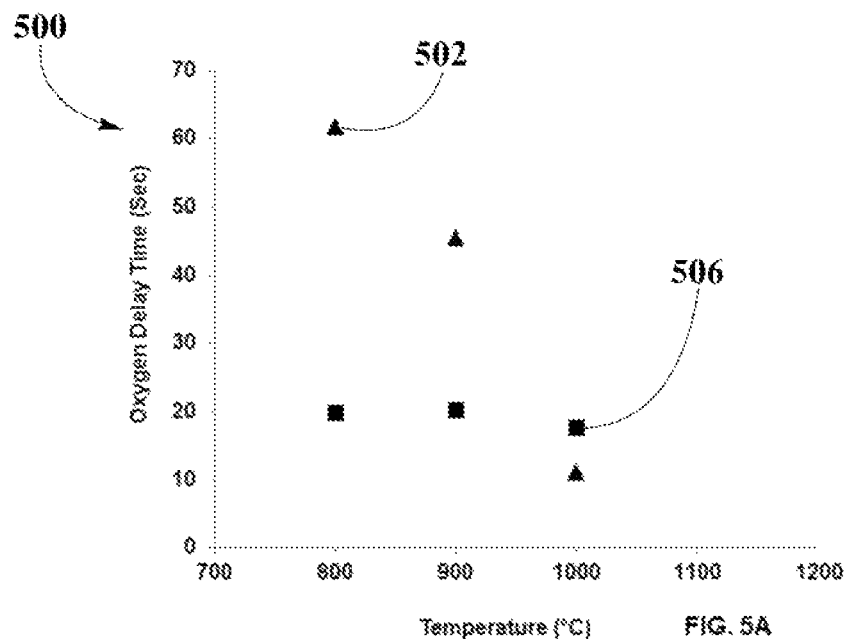
FIG. 5 depicts comparison of results from OSC isothermal oscillating tests samples of ZPGM-ZRE metals OSM and commercial PGM catalyst with RE material hydrothermally aged at different temperature, according to an embodiment.

A plurality of temperature within the range of about 800° C. to about 1,000° C. may be selected for hydrothermally aging the samples of ZPGM-ZRE metals OSM and commercial PGM samples with RE metals OSM, to measure $O_2$ and CO delay times. In FIG. 5A, each of the data points 502 (triangle points) and data points 506 (square points) represent the measured $O_2$ delay times from isothermal oscillating test performed at 575 C for selected aging temperature to compare the OSC property of ZPGM-ZRE metals OSM with the OSC property of PGM catalyst with RE metals as OSM. Similarly, in FIG. 5B, each of the data points 504 (triangle points) and data points 508 (square points) represent he measured CO delay times from isothermal oscillating test performed at a selected temperature to compare the OSC property of ZPGM-ZRE metals OSM with the OSC property of PGM catalyst with RE metals in OSM.

Figure 5B:
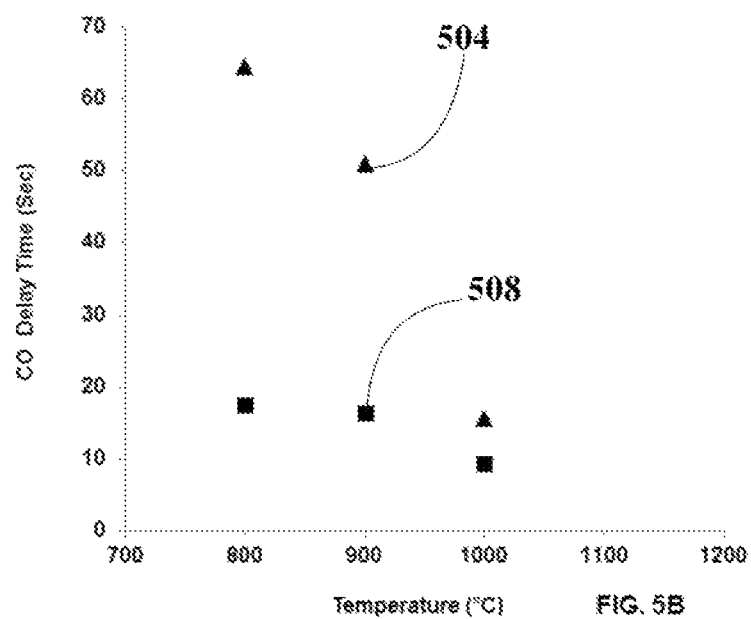

As may be seen in FIG. 5A and FIG. 5B, at hydrothermal aging temperature of about 800° C. for about 4 hours, which may be temperature suitable to simulate aging for underfloor catalyst applications, the OSC property of ZPGM-ZRE metals OSM, indicated by $O_2$ and CO delay times of about 61.82 seconds and 64.45 seconds respectively, is very high in comparison with the OSC of Ce-based OSM PGM catalyst with $O_2$ and CO delay times of about 19.9 seconds and 17.6 seconds respectively. This behavior may be an indication of the enhanced oxygen storage capacity of ZPGM-ZRE metals OSM, which may be most appropriate for certain catalyst applications. The ZPGM-ZRE metals OSM may provide optimal OSC, while maintaining or even improving upon the thermal stability and facile nature of the redox function of the used chemical components. Moreover, as may be seen in FIG. 5A and FIG. 5B, increasing the hydrothermal aging temperature for samples of ZPGM-ZRE metals OSM, may indicate that even though the OSC property may decrease, there is extensive OSC property, as depicted by $O_2$ and CO delay times, in samples of ZPGM-ZRE metals OSM at high temperatures, which in turn may indicate phase stability of ZPGM-ZRE metals OSM under aging at high temperatures, while the OSC property of Ce-based OSM PGM catalyst, lower than OSC property of ZPGM-ZRE metals OSM, may be within a range of $O_2$ delay time from about 17 seconds to about 20 seconds and CO delay time from about 9 seconds to about 17 seconds.

The ZPGM-ZRE metals OSM, prepared from a $Cu_{1.0}Mn_{2.0}O_4$ stoichiometric spinel deposited on $Nb_2O_5$—$ZrO_2$ support oxide, according to the principles in the present disclosure, may be employed in a large number of catalyst applications because of the exhibited optimal OSC property that may surpass the OSC property of PGM catalysts including RE-based OSM. Even after aging samples of ZPGM-ZRE metals OSM for an extended period of time of about 20 hours at 800° C. and under fuel condition, the $O_2$ and CO delay times may be higher than the $O_2$ and CO delay times of PGM catalysts, showing thermal stability of ZPGM-ZRE metals OSM.

Thermal stability of ZPGM-ZRE metals OSM including $Cu_{1.0}Mn_{2.0}O_4$ stoichiometric spinel deposited on $Nb_2O_5$—$ZrO_2$ support oxide may be confirmed evaluating the phase stability of the samples, which may be hydrothermally aged at the plurality of aging temperature and aging time in the present disclosure, with XRD analysis.

From the present disclosure, although the catalytic activity, and thermal and chemical stability of a catalyst during real use may be affected by factors, such as the chemical composition of the catalyst, the OSC property of ZPGM-ZRE metals OSM may provide an indication that for catalyst applications, and, more particularly, for catalyst systems, the chemical composition of ZPGM-ZRE metals OSM may have enhanced stability at high temperature of operation, and from a catalyst manufacturer's viewpoint, an essential advantage given the economic factors involved and the flexibility for use in underfloor and closed-loop coupled catalyst applications.

XRD Analysis of OSM Phase Stability

The effect of aging temperature in the phase stability of the Cu—Mn spinel phase with Niobium-Zirconia support may be analyzed/measured using XRD analysis to confirm the phase stability of ZPGM-ZRE metals OSM under hydrothermal aging condition.

The XRD analysis may be conducted to determine the phase structure Cu—Mn materials that according to principles in the present disclosure may be thermally aged at a selected range of aging temperatures within the range of about 800° C. to about 1,000° C. for about 4 hours. The XRD patterns are measured on a Rigaku® powder diffractometer (MiniFlex™) using Cu Ka radiation in the 2-theta range of 15-80° with a step size of 0.02° and a dwell time of 1 second. The tube voltage and current were set at 40 kV and 30 mA, respectively. The resulting diffraction patterns are analyzed using the International Centre for Diffraction Data (ICDD) database.

Figure 6:
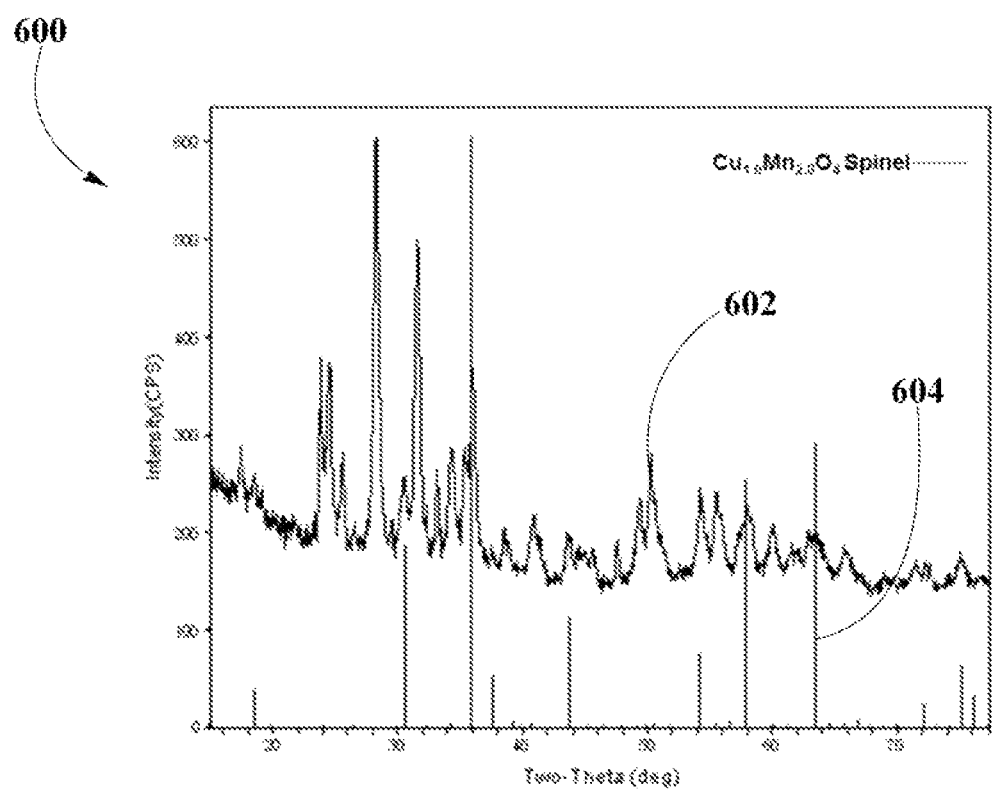
FIG. 6 shows XRD analysis for Cu—Mn spinel phase formation in a fresh sample of ZPGM-ZRE metals OSM, according to an embodiment.

FIG. 6 shows XRD analysis 600 for Cu—Mn spinel phase formation in a fresh sample of ZPGM-ZRE metals OSM, according to an embodiment.

In FIG. 6, XRD spectrum 602 shows spinel presence in fresh sample of ZPGM-ZRE metals OSM. Solid lines 604 correspond to $Cu_{1.0}Mn_{2.0}O_4$ spinel phase. The remaining diffraction peaks correspond to $ZrO_2$—$Nb_2O_5$ phases from support. As may be observed, XRD spectrum 602 indicates presence of $Cu_{1.0}Mn_{2.0}O_4$ spinel phase with cubic structure in which no separate Cu and Mn oxide phases exist. The $Cu_{1.0}Mn_{2.0}O_4$ stoichiometric spinel phase may be responsible for the resulting very high OSC of ZPGM-ZRE metals OSM, as obtained under isothermal oscillating condition, making the $O_2$ molecule more mobile and providing improved redox properties.

Figure 7:
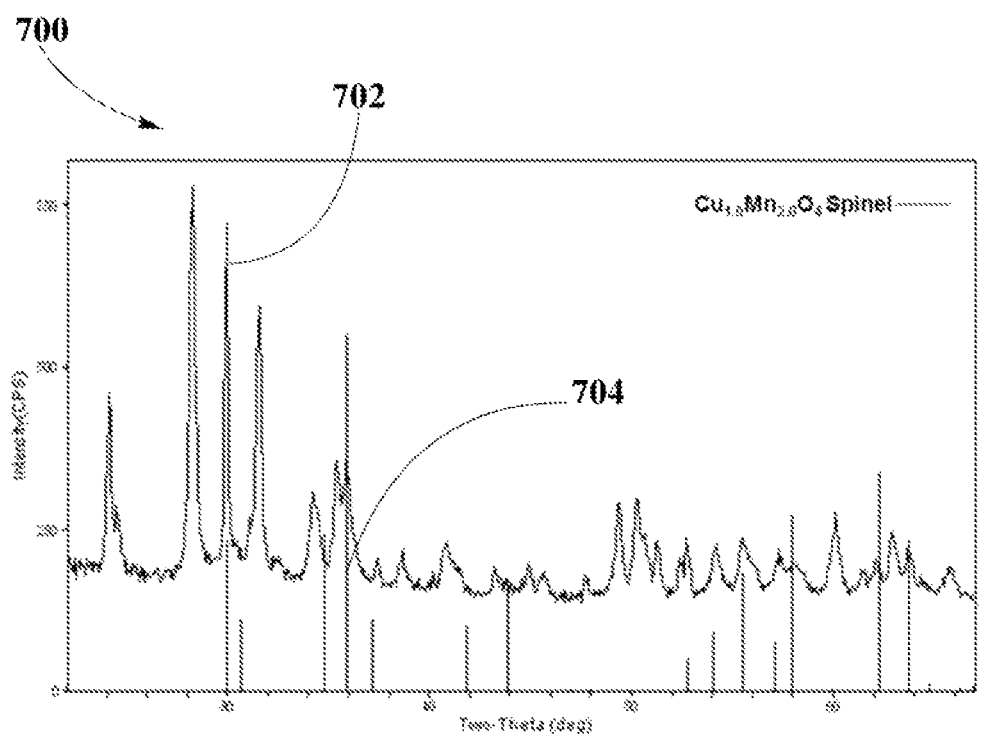
FIG. 7 depicts XRD analysis for phase stability of Cu—Mn spinel in a sample of ZPGM-ZRE metals OSM after hydrothermal aging at about 800° C., according to an embodiment.

FIG. 7 shows XRD analysis 700 for phase stability of Cu—Mn spinel in a sample of ZPGM-ZRE metals OSM after hydrothermal aging at about 800° C. for about 20 hours, according to an embodiment.

In FIG. 7, XRD spectrum 702 shows that only a $Cu_{1.0}Mn_{2.0}O_4$ spinel phase is present, without any separate oxide metals phases. Solid lines 704 correspond to $Cu_{1.0}Mn_{2.0}O_4$ stoichiometric spinel phase. However, the spinel structure has changed from cubic structure in fresh sample to a tetragonal structure by the hydrothermally aging of ZPGM-ZRE metals OSM sample at a temperature of about 800° C. for about 20 hours. The presence of $Cu_{1.0}Mn_{2.0}O_4$ stoichiometric spinel phase after aging at about 800° C. explains the high $O_2$ and CO delay times obtained for this sample as shown in FIG. 1.

Figure 8:
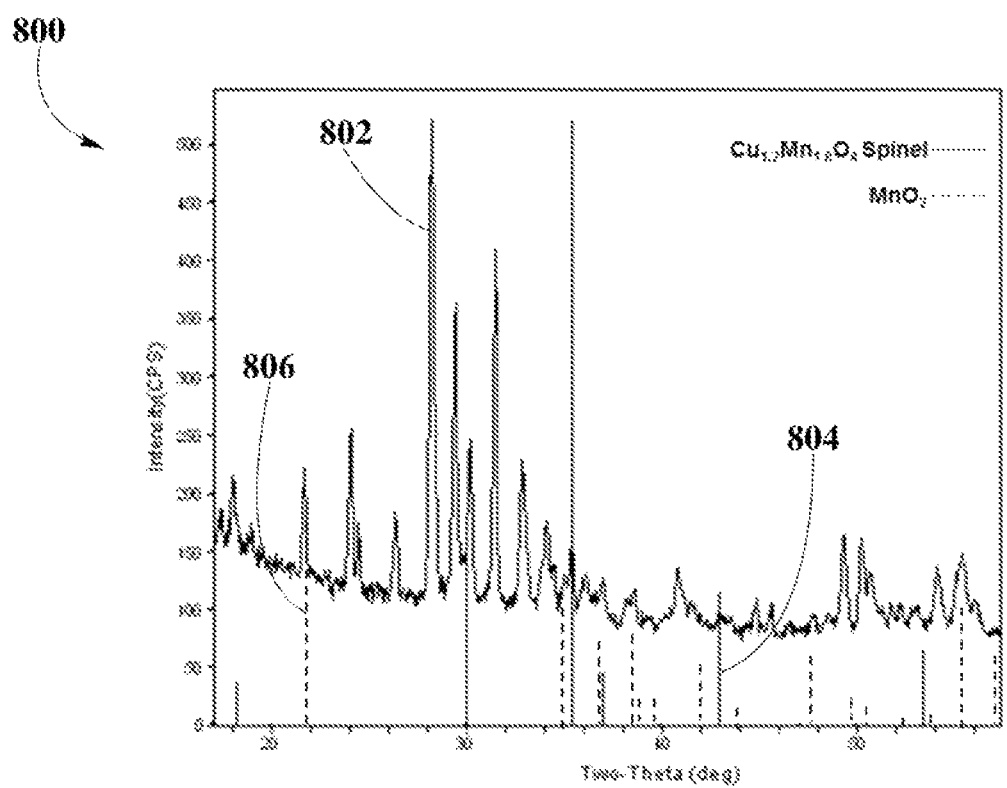
FIG. 8 illustrates XRD analysis for phase stability of Cu—Mn spinel in a sample of ZPGM-ZRE metals OSM after hydrothermal aging at about 900° C., according to an embodiment.

FIG. 8 shows XRD analysis 800 for phase stability of Cu—Mn spinel in a sample of ZPGM-ZRE metals OSM after hydrothermal aging at about 900° C. for about 4 hours, according to an embodiment.

In FIG. 8, XRD spectrum 802 shows that a $Cu_{1.2}Mn_{1.8}O_4$ non-stoichiometric spinel phase with cubic structure is present. Solid lines 804 correspond to $Cu_{1.2}Mn_{1.8}O_4$ spinel phase. However, the $Cu_{1.2}Mn_{1.8}O_4$ spinel phase is mixed with a $MnO_2$ phase. FIG. 8 also shows the $MnO_2$ phase in which dashed line 806 shows the main peak of $MnO_2$, which was neither present in the fresh sample of ZPGM-ZRE metals OSM, nor in the hydrothermally aged sample at 800° C. of ZPGM-ZRE metals OSM.

XRD analysis 800 may be correlated with the results obtained during OSC isothermal oscillating test 200, which indicates that there is $O_2$ storage in the aged ZPGM-ZRE metals OSM, with measured $O_2$ delay time of about 45.54 seconds and that there is CO adsorption/consumption by aged ZPGM-ZRE metals OSM sample with measured CO delay time of about 51.05 seconds. The measured $O_2$ and CO delay times may be an indication that a Cu—Mn spinel exists in the ZPGM-ZRE metals OSM after hydrothermal aging at about 900° C. for about 4 hours. XRD analysis 800 confirms that there is $Cu_{1.2}Mn_{1.8}O_4$ non-stoichiometric spinel phase with cubic structure, which along with the measured $O_2$ and CO delay times indicates an above satisfactory OSC property and thermal stability of the aged ZPGM-ZRE metals OSM in the present embodiment.

The different hydrothermal aging temperatures may provide ZPGM-ZRE metals OSMs in which the effect of the aging temperature may be minimized depending on the type of catalyst application. The larger OSC property exhibited by ZPGM-ZRE metals OSMs, surpassing the OSC property of commercial PGM catalysts, as well as the level of thermal stability shown at different temperatures, including hydrothermal aging at high temperatures and in fuel cut commercial aging condition, may make the ZPGM-ZRE metals OSM in present disclosure an optimal selection for a plurality of catalyst applications.

ZPGM-ZRE metals OSM may provide optimal thermal stability at different temperatures, as well as present an enhanced behavior of high thermal stability in fuel cut commercial aging condition. ZPGM-ZRE metals OSM may be employed in applications of close-coupled light-off and underfloor catalytic converters because of the shown OSC property and phase stability, which may provide catalytic activity within a satisfactory level, even at high temperatures, when compared with PGM catalyst including RE metals. ZPGM-ZRE metals OSM may be a better application for underfloor catalyst because of better stability of stoichiometric Cu—Mn spinel phase and stability of OSC at underfloor aging condition.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A catalytic composition, comprising:
   an oxygen storage material, comprising Cu—Mn spinel.

2. The catalytic composition of claim 1, wherein the oxygen storage material is substantially free of platinum group metals.

3. The catalytic composition of claim 1, wherein the oxygen storage material is substantially free of rare earth metals.

4. The catalytic composition of claim 1, wherein the Cu—Mn spinel has the formula $Cu_{1.0}Mn_{2.0}O_4$.

5. The catalytic composition of claim 1, wherein the catalytic composition comprises about 8% to about 13% by weight of Cu.

6. The catalytic composition of claim 1, wherein the catalytic composition comprises about 16% to about 21% by weight of Mn.

7. A catalytic composition, comprising:
   an oxygen storage material, comprising Cu—Mn spinel and Niobium-Zirconia support oxide.

8. The catalytic composition of claim 7, wherein the oxygen storage material is substantially free of platinum group metals.

9. The catalytic composition of claim 7, wherein the oxygen storage material is substantially free of rare earth metals.

10. The catalytic composition of claim 7, wherein the Cu—Mn spinel has the formula $Cu_{1.0}Mn_{2.0}O_4$.

11. The catalytic composition of claim 7, wherein the Niobium-Zirconia support oxide has the formula $Nb_2O_5$—$ZrO_2$.

12. The catalytic composition of claim 7, wherein the catalytic composition comprises about 8% to about 13% by weight of Cu.

13. The catalytic composition of claim 7, wherein the catalytic composition comprises about 16% to about 21% by weight of Mn.

14. The catalytic composition of claim 7, wherein the niobium-zirconia support oxide is present at about 66% to about 75% by weight.

15. The catalytic composition of claim 7, wherein the niobium-zirconia support oxide comprises about 15% to about 30% by weight $Nb_2O_5$ and about 70% to about 85% by weight $ZrO_2$.

16. The catalytic composition of claim 15, wherein the niobium-zirconia support oxide comprises about 25% by weight $Nb_2O_5$ and about 75% by weight $ZrO_2$.

17. The catalytic composition of claim 1, wherein the catalytic composition is dried and subsequently calcined at about 550° C. to about 650° C.

18. The catalytic composition of claim 17, wherein the catalytic composition is dried and subsequently calcined at about 600° C.

19. The catalytic composition of claim 7, wherein the catalytic composition is dried and subsequently calcined at about 550° C. to about 650° C.

20. The catalytic composition of claim 19, wherein the catalytic composition is dried and subsequently calcined at about 600° C.

* * * * *